United States Patent [19]

Krakauer et al.

[11] Patent Number: 5,617,283
[45] Date of Patent: Apr. 1, 1997

[54] SELF-REFERENCING MODULATION CIRCUIT FOR CMOS INTEGRATED CIRCUIT ELECTROSTATIC DISCHARGE PROTECTION CLAMPS

[75] Inventors: David B. Krakauer, Cambridge; Kaizad Mistry, Lincoln; Steven Butler, Marlboro, all of Mass.; Hamid Partovi, Sunnyvale, Calif.

[73] Assignee: Digital Equipment Corporation, Maynard, Mass.

[21] Appl. No.: 697,124

[22] Filed: Aug. 20, 1996

Related U.S. Application Data

[63] Continuation of Ser. No. 270,188, Jul. 1, 1994, abandoned.

[51] Int. Cl.$^6$ ............................................. H02H 9/04
[52] U.S. Cl. ......................................... 361/56; 361/111
[58] Field of Search ............................ 361/56, 58, 91, 361/111

[56] References Cited

U.S. PATENT DOCUMENTS

| | | | |
|---|---|---|---|
| 4,716,302 | 12/1987 | Flannagan et al. | 307/200 B |
| 4,855,620 | 8/1989 | Duvvury et al. | 307/448 |
| 4,859,875 | 8/1989 | Tihanyi et al. | 307/311 |
| 4,864,454 | 9/1989 | Wolfe | 361/111 |
| 4,989,057 | 12/1991 | Lu | 357/23.7 |
| 5,051,860 | 9/1991 | Lee et al. | 361/58 |
| 5,157,573 | 10/1992 | Lee et al. | 361/56 |
| 5,170,240 | 8/1992 | Becker et al. | 257/499 |
| 5,208,719 | 5/1993 | Wei | 361/56 |
| 5,237,395 | 8/1993 | Lee | 257/358 |
| 5,311,391 | 5/1994 | Dungan et al. | 361/56 |

*Primary Examiner*—Jeffrey A. Gaffin
*Assistant Examiner*—Michael J. Sherry
*Attorney, Agent, or Firm*—Lindsay G. McGuinness; Denis G. Maloney; Arthur W. Fisher

[57] ABSTRACT

An ESD protection device is provided which includes a self referencing modulation circuit for controlling its operation. The modulation circuit includes a diode stack coupled to a resistor and further coupled to an inverter powered by the signal pad voltage in one embodiment, or an odd plurality of series connected inverters powered by the signal pad voltage in an alternate embodiment. The inverter chain is coupled to the ESD clamp. The modulation circuit requires no reference supply voltage to operate. The ESD protection circuit shunts currents associated with ESD events away from ICs as well as clamping I/O pad voltages to acceptable levels during an ESD event.

11 Claims, 4 Drawing Sheets

SELF-REFERENCING MODULATION CIRCUIT FOR CMOS INTEGRATED CIRCUIT ELECTROSTATIC DISCHARGE PROTECTION CLAMPS

This application is a continuation, of application Ser. No. 08/270,188, filed Jul. 1, 1994 now abandoned.

BACKGROUND OF THE INVENTION

This invention relates generally to integrated circuits and more particularly to electrostatic discharge (ESD) protection of integrated circuits.

As it is known in the art, the semiconductor devices in integrated circuits (ICs) are susceptible to damage as a result of an ESD event. In particular, metal oxide semiconductor field effect transistors (MOSFETs) are prone to such damage to a much higher degree. A significant factor contributing to MOSFETs sensitivity to ESD damage is that the transistors are formed from small regions of so called N-type materials, P-type materials, and thin gate oxides. When a transistor is exposed to an ESD event, the charge applied may cause an extremely high current flow to occur within the device which can in turn cause permanent damage to the junctions, neighboring gates oxides, and/or interconnect metals.

An ESD event within an IC is typically caused by a static discharge occurring at one of the input or output pads of the IC. In an effort to guard the device against damage from the static discharge, so called ESD clamp circuits are connected between the operating circuits (which need to be protected) and their corresponding input or output pads. An ESD clamp operates to prevent the static charge from reaching the operating circuits by shunting the currents associated with an ESD event away from the operating circuits. Additionally, ESD clamps in general maintain the voltage at the pad to a value which is known to be safe for the operating circuits. Finally, an effective ESD clamp should not interfere with the protected circuits under normal operating conditions.

There are a number of ESD clamp designs in use today. Two of the most commonly used are the so called grounded-gate clamp and the so called diode-connected clamp. In the grounded-gate clamp, an ESD transistor (the shunting device) is connected between the I/O pad and a ground reference with the control terminal of the transistor coupled to the ground reference as well. For example, using an N-channel MOSFET as an ESD clamp would entail connecting its drain terminal to the I/O pad and connecting its source and gate terminals to a ground reference. This arrangement results in an ESD clamp which remains off during normal operation of the protected circuits.

The grounded-gate ESD clamp will operate in response to an ESD event as follows. An ESD event will cause the pad voltage to rise. When a trigger or threshold voltage is reached, the ESD transistor will turn on allowing current to flow through its channel to ground. The ESD transistor will reach a state where it will begin to operate in a bipolar conduction region causing the voltage at the pad to be clamped to a safe voltage level even as the pad current varies. When the ESD event ends, the ESD transistor turns off restoring the current path between the pad and the protected circuitry.

There are drawbacks associated with the grounded-gate ESD clamp design. The trigger voltage of such an ESD clamp needs to be as high as possible in order to avoid premature triggering, i.e. turning on during normal operation of the protected circuitry. However, guaranteeing high trigger voltages is difficult with the small geometries required in current semiconductor devices. Additionally, even though a grounded-gate MOSFET ESD clamp will remain off during normal operation of the protected circuit, a full range swing of switching voltages will appear at its drain since it is connected to the pad. This voltage swing creates continuous stress on the drain to gate oxide of the clamp MOSFET and over a period of time may cause changes in the clamp's operating characteristics.

The diode-connected clamp design alleviates some of the drawbacks of the grounded-gate clamp design. The diode-connected clamp is an ESD device which has its control terminal connected to the I/O pad instead of a ground reference. The threshold voltage of the device is tailored such that the ESD device remains off during normal operation of the protected circuit. However, during an ESD event which causes the pad voltage to rise above the ESD clamp's threshold voltage, the ESD clamp turns on and shunts the voltages and currents appearing at the pad to ground.

The diode-connected clamp is not without its own drawbacks. Although the channel current induced in a diode-connected clamp avoids the need for high trigger voltages and relieves the stress on the drain to gate interface, diode-connected clamps are subject to stress at the source to gate interface.

Moreover, the threshold voltage associated with either type of ESD clamp must typically be increased to insure that it remains off during normal operation of the protected circuitry. Unfortunately, a high threshold voltage also results in a higher clamping voltage whereas it is actually advantageous to clamp the pad to as low a voltage as possible during an ESD event so that the protected circuitry experiences as small a voltage as possible.

Another problem with both the grounded-gate and diode-connected clamps is that parasitic capacitance effects may activate an output of the protected circuitry during the beginning stages of an ESD event. If an activated output transistor reaches its trigger voltage before the ESD clamp reaches its own trigger voltage, the protected circuitry will be exposed and subject to ESD damage.

Still another drawback of the prior art ESD clamps is that the supply voltage used for the protected circuitry can be lower than the maximum signal voltages applied at the pads. Although this allows the protected circuitry to consume less power, it also complicates the design of an ESD clamp. For example, an ESD clamp may be required to allow a five volt signal at the pad while protecting an internal circuit which operates on two to three volts.

Lastly, some ESD clamp designs require a specific reference supply voltage be available for the ESD circuitry. This requirement complicates the design of ESD clamps and places restrictions on the designs of the protected circuitry.

SUMMARY OF THE INVENTION

In accordance with the present invention, a circuit which protects integrated circuits against damage caused by exposure to electrostatic discharge (ESD) includes an ESD clamp device having first, second, and control terminals. The first terminal is coupled to a signal line which is vulnerable to ESD. The second terminal is coupled to a ground reference. The circuit further includes a modulation control device having input and output terminals. The output terminal is coupled to the control terminal of the ESD clamp device. Additionally, the circuit further includes a reference voltage generator having a fast terminal coupled to the input terminal of the modulation control device and a second terminal coupled to a ground reference. The reference voltage generator is responsive to an ESD event to provide a reference voltage for the modulation circuit. In addition, the circuit includes a resistor having a first end coupled to the signal line and a second end coupled to the input terminal of the modulation control device. The protection circuit is responsive to an ESD event, which produces a voltage on the signal line which would otherwise exceed the safe operating voltage for the associated circuitry, for providing an activation signal at the control terminal of the ESD clamp device. Otherwise, in the absence of an ESD event, the protection circuit does not interfere with the normal operation of the protected circuitry.

In accordance with a further aspect of the present invention, a circuit which protects integrated circuits against damage caused by exposure to electrostatic discharge (ESD) includes discharge means which has a first terminal connected to an input/output (I/O) pad of the integrated circuit, a second terminal connected to a ground reference, and a control terminal. The discharge means operates in response to the presence or absence of a signal on its control terminal, to connect and disconnect respectively the first and second terminals. The apparatus further includes a self referencing modulation circuit coupled to the control terminal of the ESD clamp device. The modulation circuit requires no reference voltage, for example Vdd, to operate and is responsive to voltages at the I/O pad which exceed a predetermined threshold to provide a signal at the control terminal which activates the discharge means. Otherwise, the modulation circuit provides a signal at the control terminal of the ESD clamp device which prevents the first terminal from being connected to said second terminal thereby preventing the ESD clamp device from interfering with the normal operation of the protected integrated circuits. With such an arrangement, all nodes of an integrated circuit, including the so called "reference" voltage supply nodes (e.g. Vdd and Vss), can be protected from damage associated with ESD events occurring at the I/O pads.

In accordance with yet another aspect of the present invention, a method for protecting integrated circuits against damage due to ESD includes the steps of forming a reference voltage from the voltage produced by an ESD event and using that reference voltage to modulate a control signal which activates a clamping device during the ESD event.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENT

Figure 1:
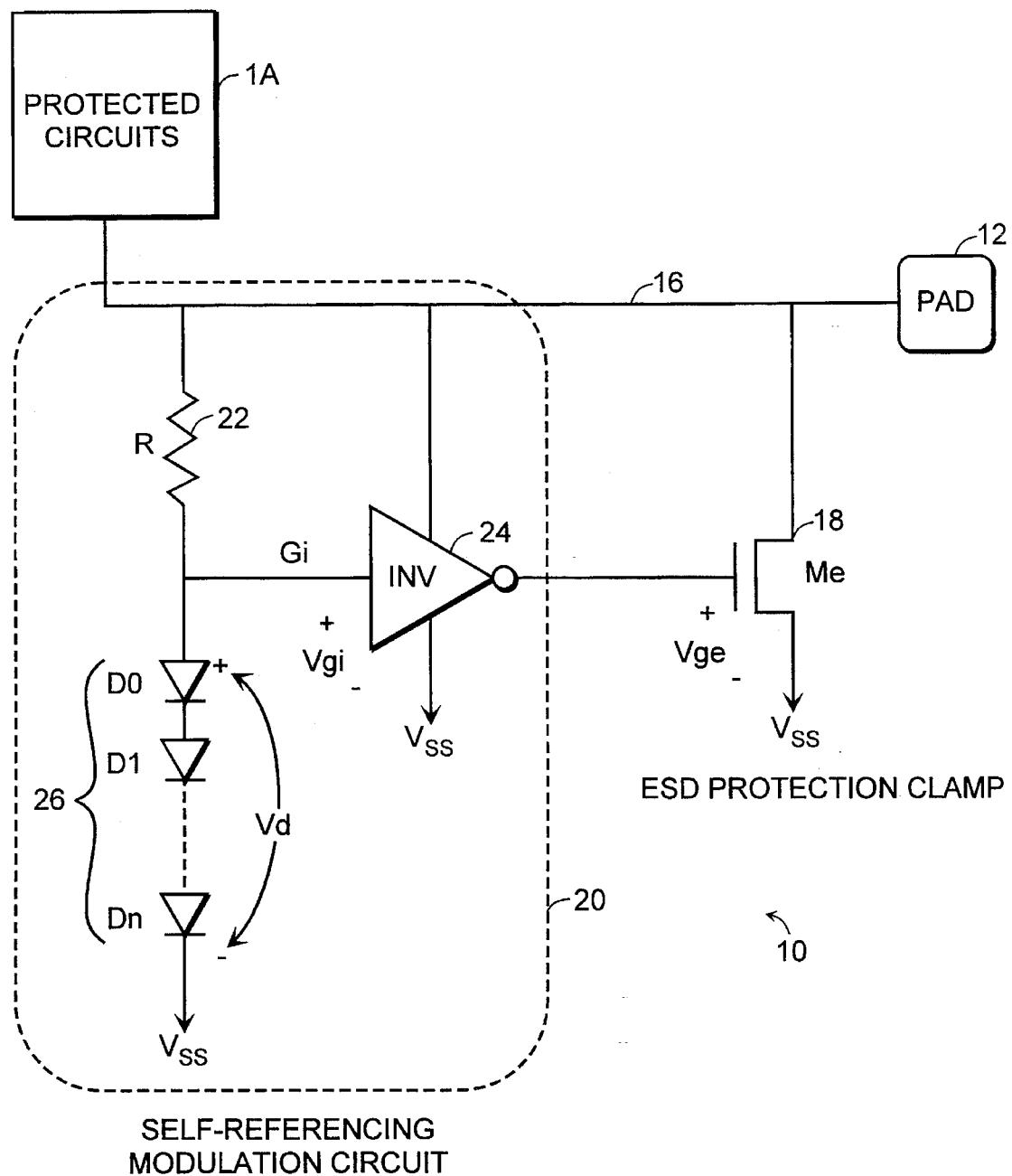
FIG. 1 is an electrical schematic diagram of a self referencing gate modulated electrostatic discharge (ESD) protection circuit.

Referring now to FIG. 1, an electrostatic discharge (ESD) protection circuit 10 is shown coupled between an input/output (I/O) pad 12 and its associated protected circuitry 14 via signal line 16. In its most general form, protection circuit 10 includes an ESD clamp device 18 and a modulation or control circuit 20.

During normal operation of the protected circuitry 14, the modulation circuit 20 prevents the ESD clamp device 18 from operating thus providing a high impedance between the pad 12 and a ground reference potential Vss. In response to an ESD event, the modulation circuit 20 activates the ESD clamp device 18, providing a low impedance path between the pad 12 and ground reference Vss. This low impedance path effectively shunts the ESD voltages and currents away from the protected circuitry 16 and in addition clamps the voltage at pad 12 to a so called "hold" or "clamp" voltage which is within the safe operating parameters of the protected circuitry 14.

Figure 2:
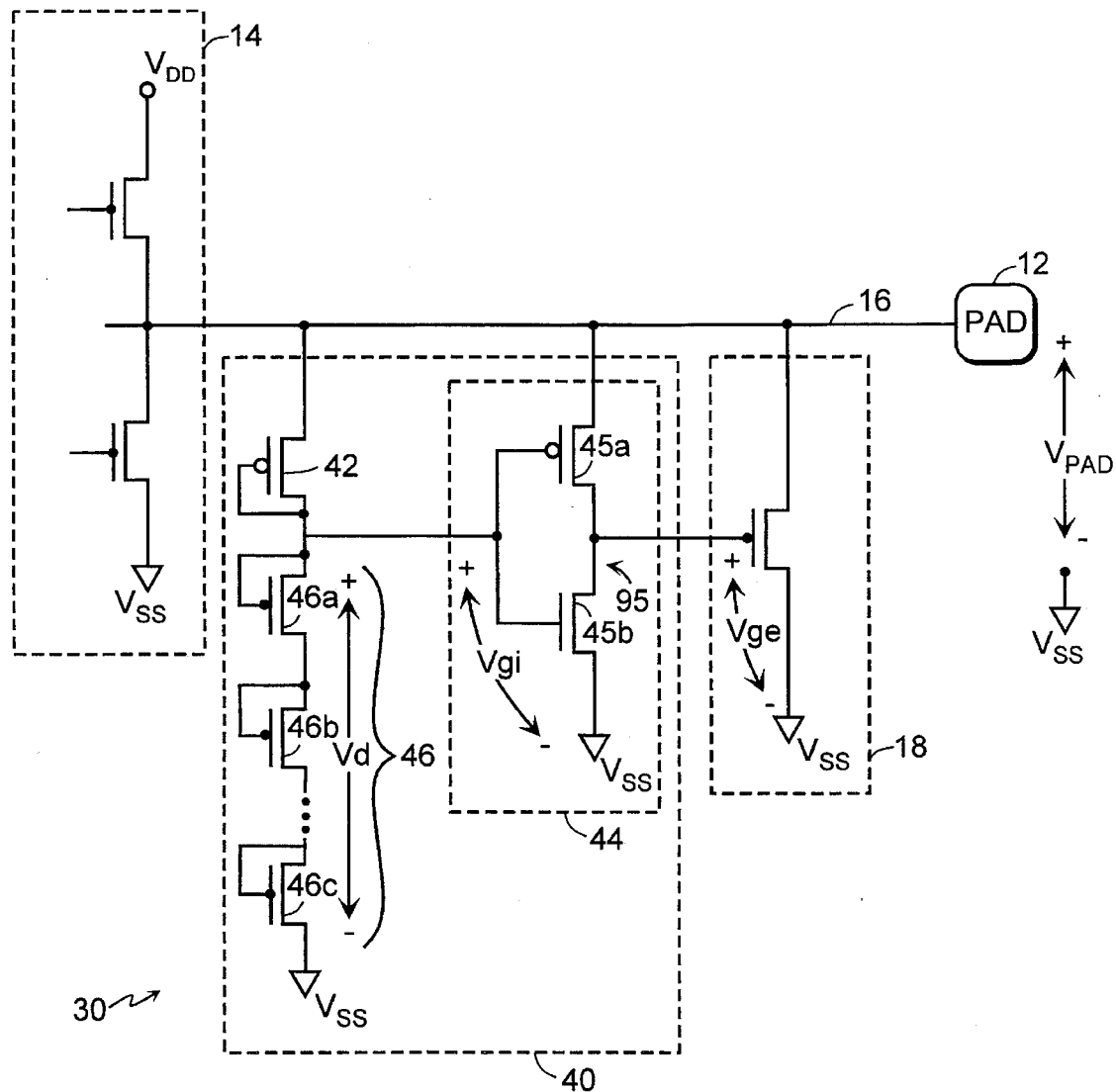
FIG. 2 is an electrical schematic diagram of an alternate embodiment of a self referencing gate modulated electrostatic discharge (ESD) protection circuit for use with complimentary metal-oxide semiconductor (CMOS) logic circuits.

Referring now to FIG. 2, and according to an alternate embodiment of the present invention, the modulation circuit 40 includes a high impedance resistor 42 here a diode connected p-type metal-oxide semiconductor (PMOS) device, a modulation and control device 44 here an inverter 45 including a PMOS transistor and an n-type metal-oxide semiconductor (NMOS) transistor which have their respective gates and respective drains coupled together. The inverter 45 has its output coupled to the gate of the ESD clamp device 18. The modulation circuit 40 also includes a plurality of diode connected NMOS devices 46a–46n which are connected in series as shown to provide a diode stack 46. The diode connected NMOS devices behave as diodes and here provide a reference turn on voltage as well as a charging voltage in response to an ESD event. The diode stack 46 has its first end coupled to the input of inverter 45. The second end of the diode stack 46 is connected to the reference potential Vss. Resistor 42 is coupled between the pad 12 and the first end of the diode stack 46 and is constructed from a PMOS transistor which has its gate coupled to its respective drain. The ESD clamp device 18 is shown as an NMOS device which further has its drain coupled to the I/O pad 12 and has its source coupled to the reference potential Vss.

Inverter 45 is responsive to an ESD event by producing a signal at its output which is used to modulate the operation of the ESD clamp device 18. By providing diode stack 46 with its fast end coupled to the input of the inverter 45 and its second end coupled to Vss, there is no need to provide a connection between the modulation circuit 40 and any reference supply voltage Vdd as would be required of the prior art techniques of providing ESD protection for ICs. The diode stack, during an ESD event, provides a reference voltage to modulate the operation of ESD clamp 18 such that it turns the clamp on during the ESD event. In the absence of an ESD event, the diode stack provides a reference voltage which causes the ESD clamp 18 to remain off during normal operation of the protected circuitry 14.

Therefore, as illustrated in FIG. 2 and according to an alternate embodiment of the present invention, an ESD protection circuit is provided which benefits from the use of a self referencing modulation circuit to control the operation of an ESD clamp device. By eliminating the need for a reference voltage supply, for example Vdd, to be available for the modulation circuit, the present invention may be used to protect the circuitry associated with the reference supply voltage itself. Moreover, the method of providing ESD protection according to the present invention can be used to protect all nodes of all CMOS integrated circuits which may be exposed to ESD transients.

Still referring to FIG. 2, the operation of ESD protection circuit 30 will now be considered in detail. During normal operation, as long as the voltage at pad 12 (Vpad) remains lower than the voltage Vd required to turn on all diodes 46a–46n, the voltage Vgi at the input of the inverter 45 will follow Vpad. This relationship follows since very little or no DC current will flow through resistor 42 while diodes 46a–46n are off.

The diode voltage Vd is tailored by choosing an appropriate number of diode devices and fabricating them in such a way that Vpad never exceeds Vd during normal operation of the protected circuitry. For example, for the ideal devices shown in FIG. 1, if the operating voltage at Vpad is 3.0 volts, there would actually need to be 6 diodes in diode stack 26 if each had a turn on threshold voltage of 0.5 volts in order for diode stack 26 to remain off during normal operation. However, due to physical considerations, such as the body effect associated with diode connected NMOS devices 46a–46n, the actual turn on voltage of the 2nd diode in the chain 46b, may be as high as 1.5 v with the turn on voltage of the third diode being as high as 3.5 v. As a result of these operating characteristics, only three diodes would be required to prevent the modulation circuit from turning on under the 3 volt normal operating conditions. Additionally, it would follow that 5.5 (0.5+1.5+3.5) volts at the pad would cause all of the diodes to turn on and clamp the voltage Vgi to be 5.5 volts. Other arrangements to provide a diode or other device stack could alternatively be used.

During normal operation, the 3 volts operating voltage will be applied at the input of inverter 45 which will cause transistor 45b to conduct and therefore couple the gate of ESD clamp 18 to Vss. Coupling the gate of ESD clamp 18 to Vss prevents it from operating and thus modulation circuit 40 prevents the ESD clamp device 18 from operating in the absence of an ESD event at pad 12.

During an ESD event, the voltage at the pad 12 will rise significantly above that which is necessary and/or safe for the operation of the protected circuitry. When Vpad exceeds the turn on voltage Vd of the diode stack 46, the diode stack clamps Vgi to be the same as Vd. The voltage Vd is the sum of all voltage drops across each diode 46a–46n. With Vgi clamped at a particular voltage, for example 5.5 volts, and the pad voltage continuing to rise, the gate to source voltage of PMOS transistor 45a will be large enough (negatively) to cause it to conduct. Although transistor 45b is also conducting at this point due to the high voltage at its gate, transistor 45a is designed (to have, for example, a larger width/length ratio) such that it "turns on harder" than gate 45b under ESD conditions thereby providing a high voltage level at the output of the inverter. This in turn causes the inverter 45 to drive the gate to source voltage Vge of the ESD clamp 18 to be above 0.0 v. Once Vge exceeds the turn on threshold voltage Vth of the ESD clamp 18, ESD clamp 18 turns on, creating a low impedance path between the pad 12 and the reference potential Vss and thereby shunts the associated ESD current away from the protected circuitry. As the voltage at the pad continues to rise, ESD clamp 18 will enter a so called "snapback" (or bipolar) region of operation.

Figure 3:
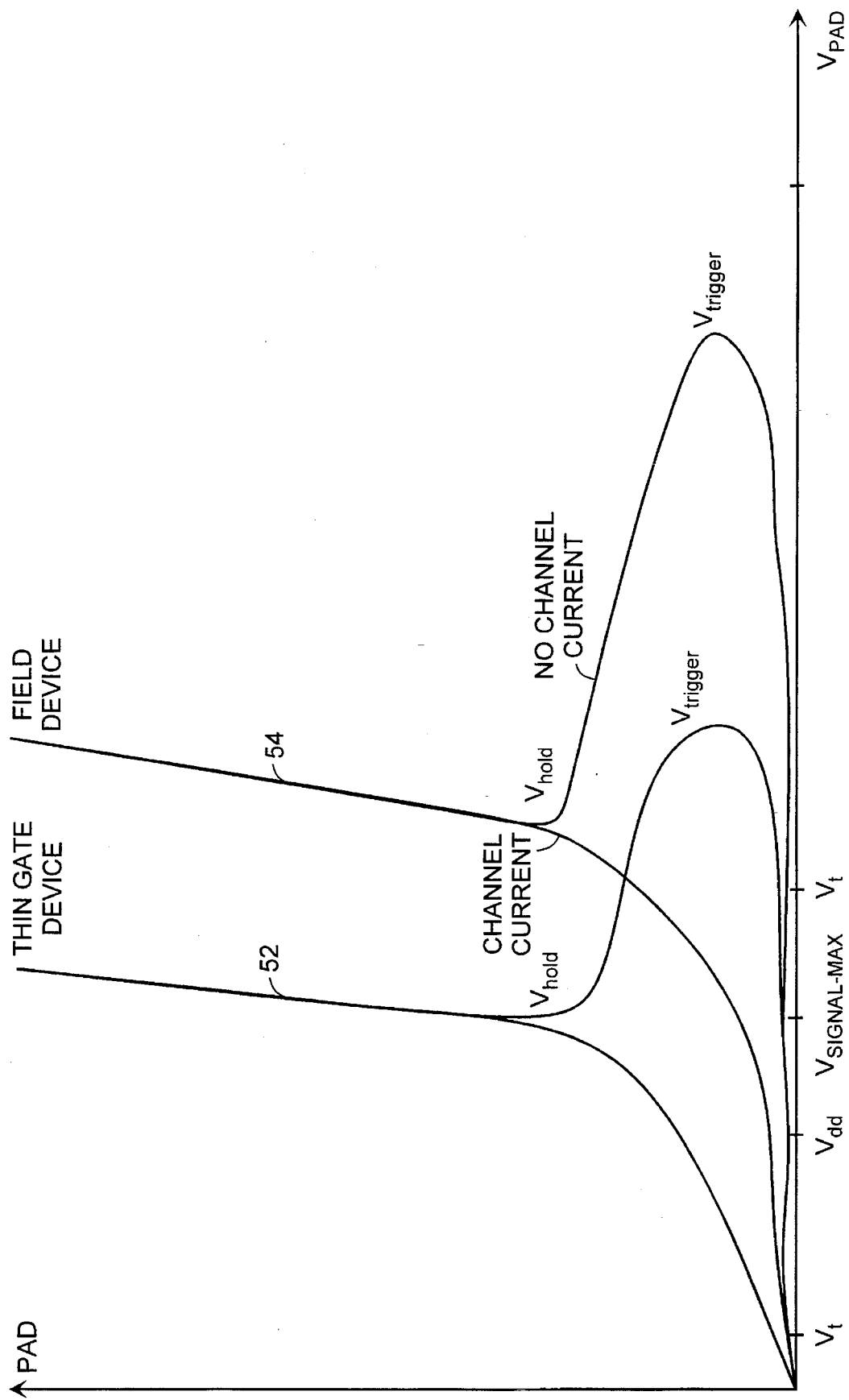
FIG. 3 is a graph showing the operating characteristics of various ESD clamp devices.

Referring now to FIG. 3, and as shown by the graph, when the voltage applied at the pad exceeds a trigger voltage of the ESD clamp device 18, the device enters a region of operation wherein the voltage at the drain of the ESD clamp device rapidly declines and is held to a particular voltage.

Curve 52 and 54 depict operating characteristics of thin gate oxide and field device ESD clamps respectively. Typical holding voltages are in the range of 5 to 8 volts. Since pad 12 is coupled to the drain of ESD clamp device 18, the voltage at pad 12 is clamped to the value of the holding voltage as well. When the gate voltage of the clamp device is less than the threshold voltage Vt, the pad voltage must reach Vtrigger in order to trip the device in a region of bipolar operation. However, when the gate voltage is greater than the threshold voltage Vt, there will be channel current in the clamp device which allows the device to enter a bipolar region of operation without experiencing punch through (i.e. Vpad reaching Vtrigger). Thus, an ESD protection circuit is provided which prevents the sensitive ICs from experiencing potentially damaging voltages and currents. Note Vtrigger (the punch through voltage of the ESD clamp device) should not be confused with the threshold voltage (i.e. turn on voltage) of the ESD clamp device.

In order for the circuit of FIG. 2 to be effective, the diode stack 46 should be activated or turn on fast enough such that the ESD clamp device 18 turns on before any damaging currents and/or voltages are experienced by I/O pad 12. To insure such operation, resistor 42 is designed to have a channel width/length ratio to maintain a proper voltage divider relationship with the diode stack 46 while also providing adequate AC response time for ESD events Referring now to FIG. 4, another alternate embodiment 60 of ESD protection circuit is shown coupled between an I/O pad 12 and its associated protected circuitry 14 via signal line 16. In its most general form, protection circuit 60 includes an ESD clamp device 18 and a modulation or control circuit 70. Modulation circuit 70 is shown to include a resistor 72, here a diode connected PMOS device, which is coupled between I/O pad 12 and a first end of a diode stack 76 which further has its second end coupled to reference potential Vss. Also coupled to the first end of the diode stack 76 is the input to modulation control circuit 74 here shown to include a plurality of inverters 75a–75c connected in series to provide a chain of inverters 75. The first inverter 75a has its input coupled to the first end of diode stack 76. The output of inverter 75a is coupled to a second inverter 75b which in turn has its output coupled to the input of inverter 75c. The output of inverter 75c is coupled to the gate of ESD clamp device 18. ESD clamp device 18 is here shown to be an NMOS type semiconductor which has its drain coupled to I/O pad 12 and its source coupled to reference potential Vss.

Figure 4:
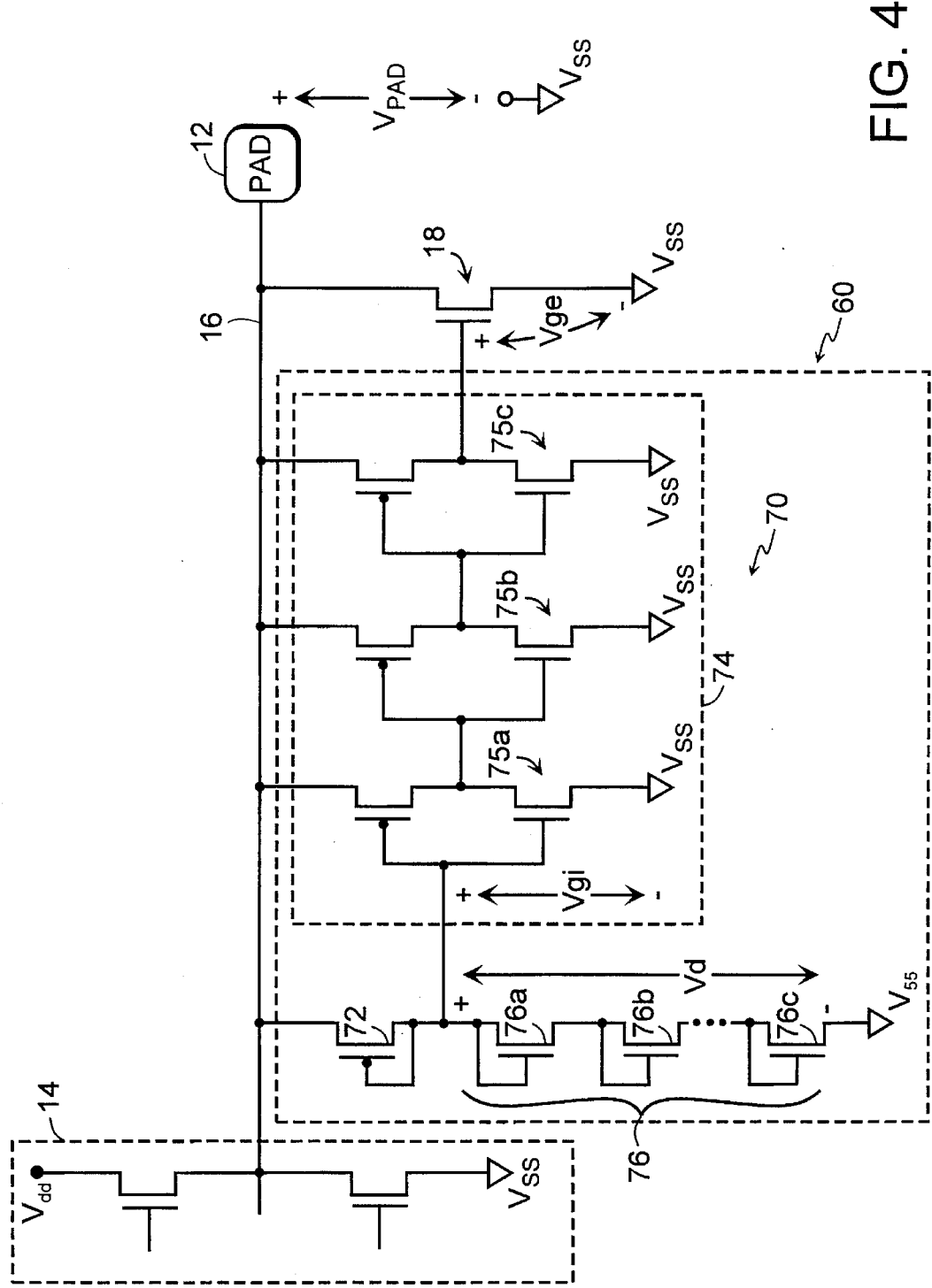
FIG. 4 is an electrical schematic diagram of another alternate embodiment of a self referencing gate modulated ESD protection circuit for use with CMOS logic circuits.

During normal operation, the ESD protection circuit 60 of FIG. 4 operates in similar fashion to the ESD protection circuit 30 of FIG. 2. That is, in the absence of an ESD event, ESD protection circuit 30 is "off" and does not interfere with the operation of the protected circuitry. During an ESD event, the voltage at I/O pad 12 rises to a point where all diodes in diode stack 76 are turned on and clamp the voltage Vgi while Vpad continues to rise. This in turn causes the inverter chain 75 to drive the gate voltage Vge of ESD clamp device 18 to be higher than 0.0 v. Ultimately, Vge reaches the turn on threshold voltage Vth of the ESD clamp device 18 which causes the ESD clamp device 18 to turn on and conduct the ESD currents away from the protected circuitry 14. Like the ESD protection circuit 20 of FIG. 2, ESD protection circuit 60 also clamps the voltage at pad 12 to a safe value, typically 5–8 volts. The difference between the circuits of FIG. 2 and FIG. 4 is that the time response of the ESD protection circuit can be tailored to react faster to ESD events by careful design of inverter 75a. By designing inverter 75a to be sensitive to small changes at its input (i.e.

to have a low turn on threshold voltage compared to inverters 75b and 75c), the resistor design constraints which accompany the circuit of FIG. 2 are mitigated. That is, resistor 72 need not be constructed to have a long channel. As such, the overall space required on an IC for the ESD protection circuit is greatly reduced.

Having described a preferred embodiment of the invention, it will now become apparent, to one of skill in the art that other embodiments incorporating its concepts may be used. It is felt therefore, that this invention should not be limited to the disclosed embodiment, but rather should be limited only by the spirit and scope of the appended claims.

What is claimed is:

1. An electrostatic discharge (ESD) protection circuit comprising:

an ESD clamp device having first and second terminals and a control terminal, said first terminal coupled to a signal line susceptible to ESD and said second terminal coupled to a ground reference;

a modulation control device having input and output terminals, said output terminal coupled to said control terminal of said ESD clamp device;

a reference voltage generator having a first terminal coupled to said input terminal of said modulation control device and a second terminal coupled to said ground reference;

a resistor having a first end coupled to said signal line and a second end coupled to said input terminal of said modulation control device and said first terminal of said reference voltage generator, wherein said resistor comprises a PMOS transistor having its gate terminal coupled to its drain terminal.

2. The circuit of claim 1 wherein said modulation control device is an inverter circuit having a supply power input coupled to said signal line.

3. The circuit of claim 2 wherein said reference voltage generator device is a diode stack comprising a plurality of series connected diodes.

4. The apparatus of claim 3 wherein each of said plurality of diodes comprises an NMOS transistor having its drain terminal coupled to its respective gate terminal.

5. The apparatus of claim 2 wherein said inverter circuit comprises a complimentary metal-oxide semiconductor (CMOS) inverter circuit.

6. The circuit of claim 2 wherein said inverter circuit comprises an odd plurality of inverters connected in series with an input terminal of a first one of said plurality of inverters being coupled to said first end of said diode stack, an output terminal of a last one of said plurality of inverters being coupled to the control terminal of said ESD clamp device, and intermediate ones of said plurality of inverters arranged with output terminals being coupled to input terminals of a succeeding one of said intermediate inverters.

7. An electrostatic discharge (ESD) protection circuit comprising:

discharge means having a first terminal connected to an input/output (I/O) pad of an integrated circuit, a second terminal connected to a ground reference, and a control terminal, said discharge means operable in response to assertion or de-assertion of a signal on said control terminal, for connecting and disconnecting respectively said first terminal and said second terminal;

self referencing modulation circuit means having an output coupled to said control terminal, said modulation circuit means requiring no reference supply voltage and being responsive to a voltage at said I/O pad which exceeds a predetermined threshold, for providing a signal at said control terminal to activate said discharge means, said modulation circuit means otherwise providing a signal at said control terminal to prevent said first terminal from being connected to said second terminal and further including a resistor having a first terminal and a second terminal, said first terminal coupled to said pad wherein said resistor comprises a PMOS transistor having its gate terminal coupled to its drain terminal; a diode stack comprising a plurality of series connected diodes, said diode stack having a first end connected to a second terminal of said resistor and a second end connected to a ground reference; and inverter means having an input terminal coupled to said second terminal of said resistor and an output terminal coupled to the control terminal of said discharge means.

8. The apparatus of claim 7 wherein said inverter means comprises a complimentary metal-oxide semiconductor (CMOS) inverter circuit.

9. The apparatus of claim 7 wherein each of said plurality of diodes comprises an NMOS transistor having its drain terminal coupled to its gate terminal.

10. The apparatus of claim 7 wherein said inverter means comprises an odd plurality of inverters connected in series with an input terminal of a first one of said plurality of inverters being coupled to said first end of said diode stack, an output terminal of a last one of said plurality of inverters being coupled to the control terminal of said discharge means, and intermediate ones of said plurality of inverters arranged with output terminals being coupled to input terminals of a succeeding one of said intermediate inverters.

11. The apparatus of claim 10 wherein each of said plurality of inverter means comprises a complimentary metal-oxide semiconductor (CMOS) inverter circuit.

\* \* \* \* \*